No. 610,970. Patented Sept. 20, 1898.
J. McALPINE.
BALL BEARING.
(Application filed Dec. 13, 1897.)
(No Model.)
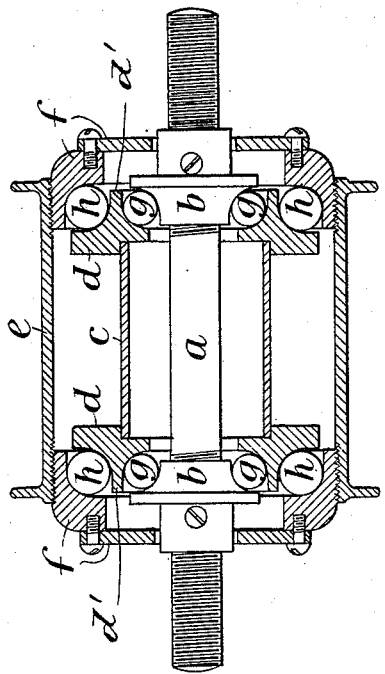
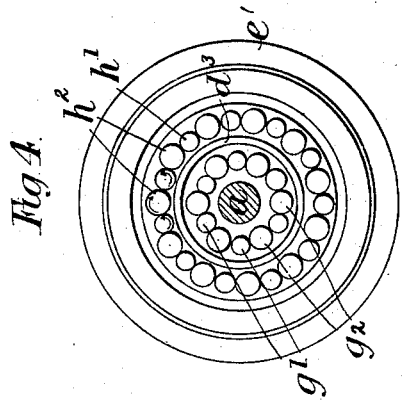
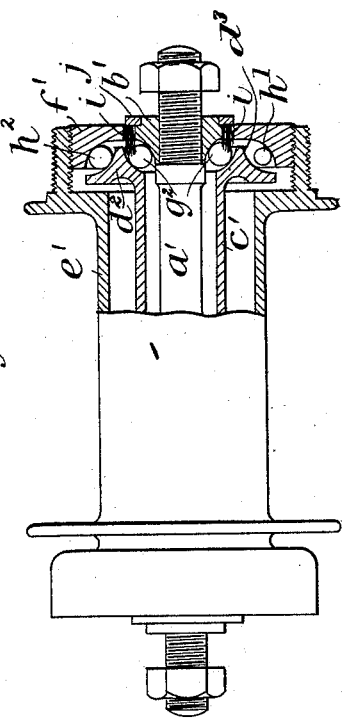
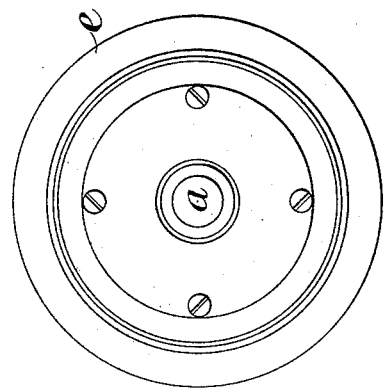
Witnesses
Inventor
John McAlpine

UNITED STATES PATENT OFFICE.

JOHN McALPINE, OF LONDON, ENGLAND, ASSIGNOR OF TWO-THIRDS TO EDWARD STRONG TORREY AND THOMAS STAMPS ALLDEN, OF SAME PLACE.

BALL-BEARING.

SPECIFICATION forming part of Letters Patent No. 610,970, dated September 20, 1898.

Application filed December 13, 1897. Serial No. 661,700. (No model.)

*To all whom it may concern:*

Be it known that I, JOHN MCALPINE, a subject of the Queen of Great Britain, residing at Leyton, London, Essex, England, have invented new and useful Improvements in Ball-Bearings, of which the following is a specification.

My invention relates to bearings especially designed for use in connection with bicycles and horseless carriages, but also applicable for use upon or in connection with ordinary carriages, tram-cars, railway-vehicles, perambulators, block-sheaves, steering-gear sheaves, shafting, engines, and the like, the object of my invention being to reduce friction, and thereby enable the driving power to be utilized more efficiently than with ordinary bearings.

In carrying out my invention I combine a sleeve and balls in a novel manner, the sleeve being concentric with the shaft, while the balls are arranged between the shaft and the sleeve and between the sleeve and the casing.

In connection with my improved ball-bearing I provide bristles upon the inside of the end disks of the bearing, the said bristles extending into the bearing into contact with the balls, so as to keep them perfectly clean, thus obviating the necessity for the employment of a lubricant.

To enable my invention to be fully understood, I will describe the same as applied to the hub of a cycle-wheel, reference being had to the accompanying drawings, in which—

Figure 1 is an end elevation of the axle and hub, and Fig. 2 a longitudinal section of the same. Fig. 3 is a sectional elevation of a bearing constructed according to the invention and having large and small balls placed alternately. Fig. 4 is an end view of the same with the end disk removed.

$a$ is the fixed axle, and $b\ b$ are cones adjustable upon the said axle. $c$ is a sleeve which in the arrangement shown in Figs. 1 and 2 is composed of a cylinder or tube provided at each end with a cone $d$. In Fig. 2 these cones are formed separately from the cylinder or tube; but they may be formed integrally therewith, as shown in Fig. 3. Each of these cones has an annular flange $d'$, with a ball-race within and another ball-race surrounding said annular flange.

$e$ is a wheel-hub or outer casing of the bearing. $f\ f$ are the cups thereof, and $g\ g\ h\ h$ are the balls interposed between the cones $d$ and the inner ball-races of the cones $d$ and between the outer ball-races of the cones $d$ and the cups $f\ f$, the faces of the cones $b\ b$ and cups $f\ f$, with which the balls come in contact, being suitably shaped to form races for the balls. The cones $b\ b$ are adjustable on the axle, and the cups $f\ f$ are adjustable in the hub or casing, so that the bearing can be readily adjusted. With this arrangement it will be understood that the motion between the axles and the hub instead of being taken up by one set of balls, as has hitherto been usual, is divided between two sets of balls and the sleeve $c$, which floats between the said balls, so that the wear and tear are greatly reduced.

In the form of my invention shown in Figs. 3 and 4 $a'$ represents the axle and $b'\ b'$ are the cones on said axle. $c'$ is the sleeve, which in this instance has the cones $d^2\ d^2$ formed integrally therewith and provided with the annular flange $d^3$. $e'$ is the wheel-hub, provided with the cups $f'\ f'$ and $g'\ h'$. $g^2\ h^2$ are the balls.

In the arrangement shown in Figs. 3 and 4 the balls of each set are alternately large and small, as indicated by $h\ g$ and $h'\ g'$, respectively. The large balls $h$ and $g$ are of such a size that they are in contact with the two opposite cones of each race, and the smaller balls $g'\ h'$ are of such a size that they are in contact only with one cone of each ball-race, so that they are only caused to rotate by reason of their contact with the neighboring larger balls, which are rotated by the revolving shell of the bearing in the ordinary manner. The arrows in Fig. 4 clearly show the manner in which the alternate balls rotate in opposite directions.

$i$, Fig. 3, are the bristles, which are shown extending into the inner ball-races in contact with the balls, so as to effectually clean the same and to dispense with the necessity of a lubricant, the said bristles being carried upon rings $j$, which overlap the adjacent edges of the cones $b\,b$ and cups $f\,f$. It will be obvious that the outer ball-races can be similarly provided with bristles.

In the drawings I have represented the bearing as having one sleeve and two sets of balls; but it is to be understood that two or more sleeves and a corresponding number of sets of balls may be used; also, instead of the balls $g\,g$ and $h\,h$ I may use small cylindrical antifriction-rollers, the faces of the cones $b$ and $d\,d$ and of the hub, with which the balls come in contact, being formed to correspond.

In the arrangement illustrated the ball-races are arranged at the sides of the hub, which latter has its ends formed to inclose the parts. It is to be understood, however, that the races may be placed at any other suitable point inside the hub-casing.

When the invention is applied as a bearing for a rotating shaft, the outer casing is suitably fixed in a plumber-block or other holder.

Having now particularly described and ascertained the nature of my said invention and in what manner the same is to be performed, I declare that what I claim is—

1. In a ball-bearing, the combination with the shaft, of a sleeve surrounding said shaft and a cone at each end of the sleeve having an annular flange and a ball-race within and another ball-race surrounding said annular flange, the casing surrounding said sleeve, cups secured in the ends of said casing, cones secured to said shaft, and balls interposed between said cones and the inner ball-races of the said sleeve and between the outer ball-races of said sleeve and said cups, substantially as described.

2. In a ball-bearing, the combination with the shaft, of a sleeve surrounding said shaft and a cone at each end of the sleeve having an annular flange and a ball-race within and another ball-race surrounding said annular flange, the casing surrounding said sleeve, cups secured in the ends of said casing, cones secured to said shaft, and balls interposed between said cones and the inner ball-races of the said sleeve, and between the outer ball-races of said sleeve and said cups, and bristles extending into engagement with said balls for cleaning the same, substantially as described.

3. In a ball-bearing, the combination with the shaft, of a sleeve surrounding said shaft and a cone at each end of the sleeve having an annular flange and a ball-race within and another ball-race surrounding said annular flange, the casing surrounding said sleeve cups secured in the ends of said casing, cones secured to said shaft, and balls interposed between said cones and the inner ball-races of the said sleeve, and between the outer ball-races of said sleeve and said cups, and a ring overlapping the adjacent edges of said cones and cups, and provided with bristles extending between the said parts into contact with the balls, for cleaning the same, substantially as described.

4. In a ball-bearing the combination with the shaft, a sleeve surrounding said shaft and provided at each end with a ball-race, cones on said shaft, balls interposed between said cones and the ball-races on said sleeve, and bristles extending into engagement with the balls for cleaning the same, substantially as described.

JOHN McALPINE.

Witnesses:
 G. F. REDFERN,
 C. G. REDFERN.